United States Patent
Kang et al.

(10) Patent No.: US 7,194,909 B2
(45) Date of Patent: Mar. 27, 2007

(54) PRESSURE AND VIBRATION SENSING APPARATUS

(75) Inventors: Young Hoon Kang, Gyeonggi-Do (KR); Tai Eun Kim, Gyeonggi-Do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 11/049,658

(22) Filed: Feb. 4, 2005

(65) Prior Publication Data
US 2005/0257621 A1    Nov. 24, 2005

(30) Foreign Application Priority Data
May 21, 2004   (KR) .................. 10-2004-0036206

(51) Int. Cl.
*G01L 11/00*   (2006.01)
(52) U.S. Cl. .................... 73/702; 73/704; 73/24.01
(58) Field of Classification Search ............. 73/24.01, 73/23.29, 702, 204
See application file for complete search history.

(56) References Cited

U.S. PATENT DOCUMENTS

| | | | | |
|---|---|---|---|---|
| 4,098,133 A | * | 7/1978 | Frische et al. ............ | 73/702 |
| 4,297,872 A | * | 11/1981 | Ikeda et al. .............. | 73/32 A |
| 4,435,986 A | * | 3/1984 | Choffat .................... | 73/702 |
| 4,872,335 A | * | 10/1989 | Tsuruoka et al. ......... | 73/24.01 |
| 2003/0228881 A1 | * | 12/2003 | Yamamoto et al. ....... | 455/550.1 |
| 2004/0231424 A1 | * | 11/2004 | Esashi et al. ............. | 73/702 |
| 2005/0268721 A1 | * | 12/2005 | Rudkin ..................... | 73/702 |

FOREIGN PATENT DOCUMENTS

| KR | 1-250832 A | 10/1989 |
|---|---|---|
| KR | 05-203664 A | 8/1993 |
| KR | 7-229782 A | 8/1995 |
| KR | 9-318657 A | 12/1997 |
| KR | 10-0165516 B1 | 9/1998 |
| KR | 11-14445 A | 1/1999 |
| KR | 2000-0061572 A | 10/2000 |
| KR | 2001-183229 A | 7/2001 |
| KR | 10-0338262 B1 | 5/2002 |
| KR | 2003-0021108 A | 3/2003 |

* cited by examiner

*Primary Examiner*—Andre J. Allen
(74) *Attorney, Agent, or Firm*—Sughrue Mion, PLLC

(57) ABSTRACT

A pressure and vibration sensing apparatus designed to sense pressure together with vibration through one apparatus. The pressure and vibration sensing apparatus includes a case adapted to be mounted in a machine generating vibration and having an inlet communicated with a source of pressure, a pressure sensor sensing pressure variation in the case, and a vibrating member retractably disposed in the case to induce the pressure variation in the case when vibration is generated in the machine.

9 Claims, 5 Drawing Sheets

PRESSURE AND VIBRATION SENSING APPARATUS

CROSS-REFERENCE TO RELATED APPLICATION

This application claims the benefit of Korean Patent Application No. 2004-36206, filed on May 21, 2004 in the Korean Intellectual Property Office, the disclosure of which is incorporated herein by reference.

BACKGROUND OF THE INVENTION

1. Field of the Invention

An apparatus consistent with the present invention relates to a pressure and vibration sensing apparatus designed to sense pressure together with vibration through a unitary device.

2. Description of the Related Art

Generally, a cleaning apparatus employing water, such as a washing machine or a dish washer, comprises a level sensor to detect water level in the cleaning apparatus when supplying the water into the apparatus. As for such a level sensor, a pressure sensor to sense pressure variation caused by variation in water level is typically used. Furthermore, the cleaning apparatus comprises a vibration sensor to detect vibration generated when the cleaning apparatus is operated.

There are many applications, which separately include the pressure sensor and the vibration sensor for the purpose of sensing the pressure and the vibration. For instance, as for such an application, there are a tank for storing hazardous materials sensitive to pressure or vibration, such as flammable chemical materials, wind tunnel test equipment in a laboratory required to sense wind pressure and vibration, and the like.

However, conventionally, the pressure and vibration sensors are separately manufactured, and then disposed in the apparatus. Thus, the number of components in the apparatus having these sensors is increased, thereby complicating the construction of the apparatus and increasing manufacturing costs.

In order to solve the aforementioned problem, Korean Patent No. 10-338262 issued on May 27, 2002 discloses a sensor for detecting water level and vibration, wherein pressure and vibration detection can be performed through a unitary device. The sensor for detecting the water level and the vibration disclosed in Korean Patent No. 10-338262 comprises: a diaphragm deformable according to air pressure variation caused by variation in water level in a washing machine; a core displaceable according to a deformation state of the diaphragm; a case encasing the diaphragm and the core; and a coil disposed in the case in such a manner that the case surrounds the coil to detect displacement of the core.

The sensor for detecting the water level and the vibration further comprises a vibration sensing part provided to define a predetermined space in one side of the core and having a sloped surface, and a rolling member movably disposed in the vibration sensing part. Accordingly, when the vibration is generated in a machine, the rolling member in the vibration sensing part induces an inductance variation in the coil while moving along the sloped surface of the vibration sensing part, sensing the vibration.

The sensor for detecting the water level and the vibration is integrated into one body so as to sense the water level along with the vibration. However, since the sensor comprises the diaphragm, the core, and the coil, as components to sense the pressure variation according to the variation in water level, and comprises the vibration sensing part having the sloped surface and the rolling member as components to sense the vibration, a lot of components are provided in the sensor, thereby complicating the construction and increasing the manufacturing costs. Furthermore, since the sensor adopts a principle of sensing vibration caused by movement of the rolling member when the vibration is generated in a machine, it is difficult to sense a minute vibration and the magnitude thereof.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

An apparatus consistent with the present invention has been made in view of the above and other problems, and an aspect of the present invention is to provide a pressure and vibration sensing apparatus, designed to sense pressure together with vibration, and to have a simple construction, allowing easy manufacturing and reducing manufacturing costs.

It is another aspect of the present invention to provide a pressure and vibration sensing apparatus, designed to accurately sense a minute vibration and the magnitude thereof.

Additional aspects and/or advantages of the invention will be set forth in part in the description which follows and, in part, will be apparent from the description, or may be learned by practice of the invention.

Consistent with the present invention, these and/or other aspects are accomplished by providing a pressure and vibration sensing apparatus, comprising: a case adapted to be mounted in a machine generating vibration and having an inlet communicated with a source of pressure; a pressure sensor sensing pressure variation in the case; a vibrating member movably disposed in the case to induce the pressure variation in the case when vibration is generated in the machine.

In accordance with the present invention, the pressure sensor may be disposed at the opposite side of the inlet of the case.

The vibrating member may comprise a stretchable connecting member substantially air-tightly connecting an outer periphery of the vibrating member and an inner surface of the case while allowing movement of the vibrating member, and an air vent penetrating the vibrating member.

The vibrating member may be disposed between the inlet of the case and the pressure sensor in the case.

The pressure and vibration sensing apparatus may further comprise: an outlet formed at the opposite side of the inlet of the case; and a connecting tube connecting the outlet and the pressure sensor to sense the pressure variation transferred through the outlet, the vibrating member being disposed between the inlet and the outlet of the case in the case.

The pressure sensor may be a piezoelectric element.

The pressure and vibration sensing apparatus may further comprise an amplifying circuit to amplify an electrical signal output from the pressure sensor.

BRIEF DESCRIPTION OF THE DRAWINGS

These and/or other aspects and advantages of the invention will become apparent and more readily appreciated from the following description of the exemplary embodiments, taken in conjunction with the accompanying drawings, in which.

Figure 1:
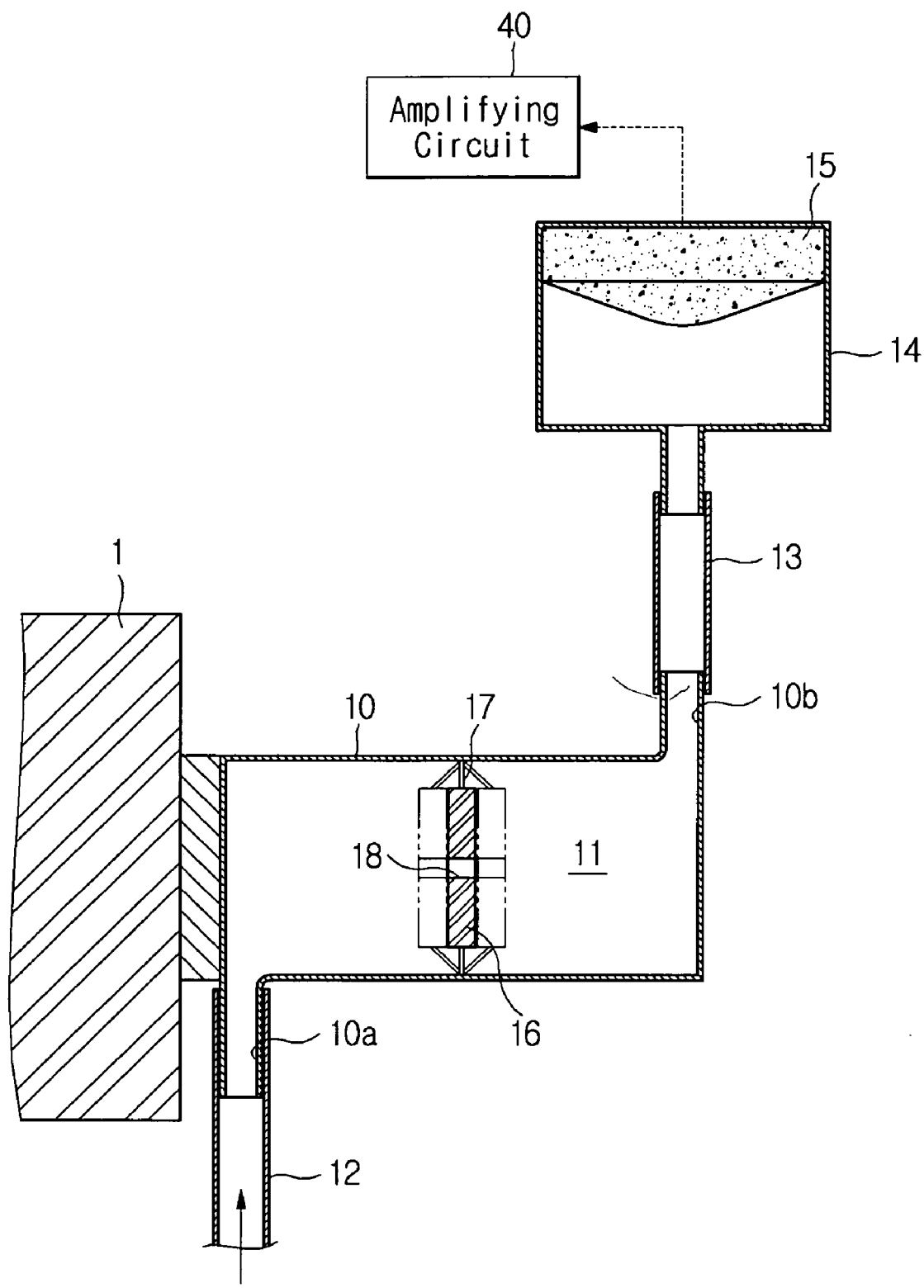
FIG. 1 is a cross-sectional view illustrating the construction of a pressure and vibration sensing apparatus according to a first embodiment of the present invention.

DETAILED DESCRIPTION OF THE ILLUSTRATIVE, NON-LIMITING EMBODIMENTS OF THE INVENTION

Reference will now be made in detail to the embodiments of the present invention, examples of which are illustrated in the accompanying drawings, wherein like reference numerals refer to the like elements throughout the drawings. The exemplary embodiments are described below to explain the present invention by referring to the figures.

A pressure and vibration sensing apparatus consistent with the present invention can be applied to a machine requiring a pressure sensing apparatus along with a vibration sensing apparatus, and an application thereof will be described below. Referring to FIG. 1, the pressure and vibration sensing apparatus comprises a case 10 mounted on an outer surface of a machine 1 generating vibration. The case has a pressure space 11 defined therein, and is formed with an inlet 10a and an outlet 10b at opposite sides of the case 10. The inlet 10a of the case 10 is communicated with a source of pressure, not shown, in the machine 1 through a pressure tube 12, such as a pipe, a hose, etc. That is, a portion required to have pressure measurement in the machine 1 and an inner portion of the case 10 are communicated to each other through the pressure tube 12, whereby the pressure space 11 in the case 1 can be subjected to pressure variation according to the pressure variation of the machine 1.

The pressure and vibration sensing apparatus comprises a sensor case 14 connected to the outlet 10b of the case via a connecting tube 13, and a pressure sensor 15 provided in the sensor case 14. Accordingly, when the pressure in the case 10 is transferred to an inner portion of the sensor case 14 through the connecting tube 13, the pressure sensor 15 senses the pressure, so that the pressure variation in the machine 1 can be sensed. The pressure sensor 15 may comprise a typical piezoelectric element, which converts the pressure variation into an electrical signal, and detects variation in the electrical signal, thereby sensing the pressure variation. The electrical signal output from the pressure sensor 26 is amplified through an amplifying circuit 40.

The pressure and vibration sensing apparatus also comprises a vibrating member 16 movably disposed in the pressure space 11 of the case 10 in order not only to allow the pressure variation in the machine 1 to be sensed through the pressure variation in the case 10, but also to allow vibration transferred from the machine 1 to the case 10 to be sensed when the vibration is generated in the machine 1. The vibrating member 16 has a disc shape having a predetermined weight and an outer diameter smaller than an inner diameter of the case 10. The vibrating member 16 is held in the case 10 by a connecting member 17, which air-tightly connects an outer periphery of the vibrating member 16 and an inner surface of the case 10, and can be stretched to allow movement of the vibrating member 16. The vibrating member 16 is formed at the center thereof with an air vent 18 penetrating the vibrating member 16 such that the pressure transferred to the inner portion of the case 10 through the inlet 10a of the case 10 can also be transferred to the pressure sensor 15 when measuring the pressure in the machine 1. The vibrating member 16 is preferably, but not necessarily, made of a rubber or a resin having a predetermined thickness, and the stretchable connecting member 17 is preferably, but not necessarily, made of a rubber having a thin film shape with good stretch.

Figure 2:
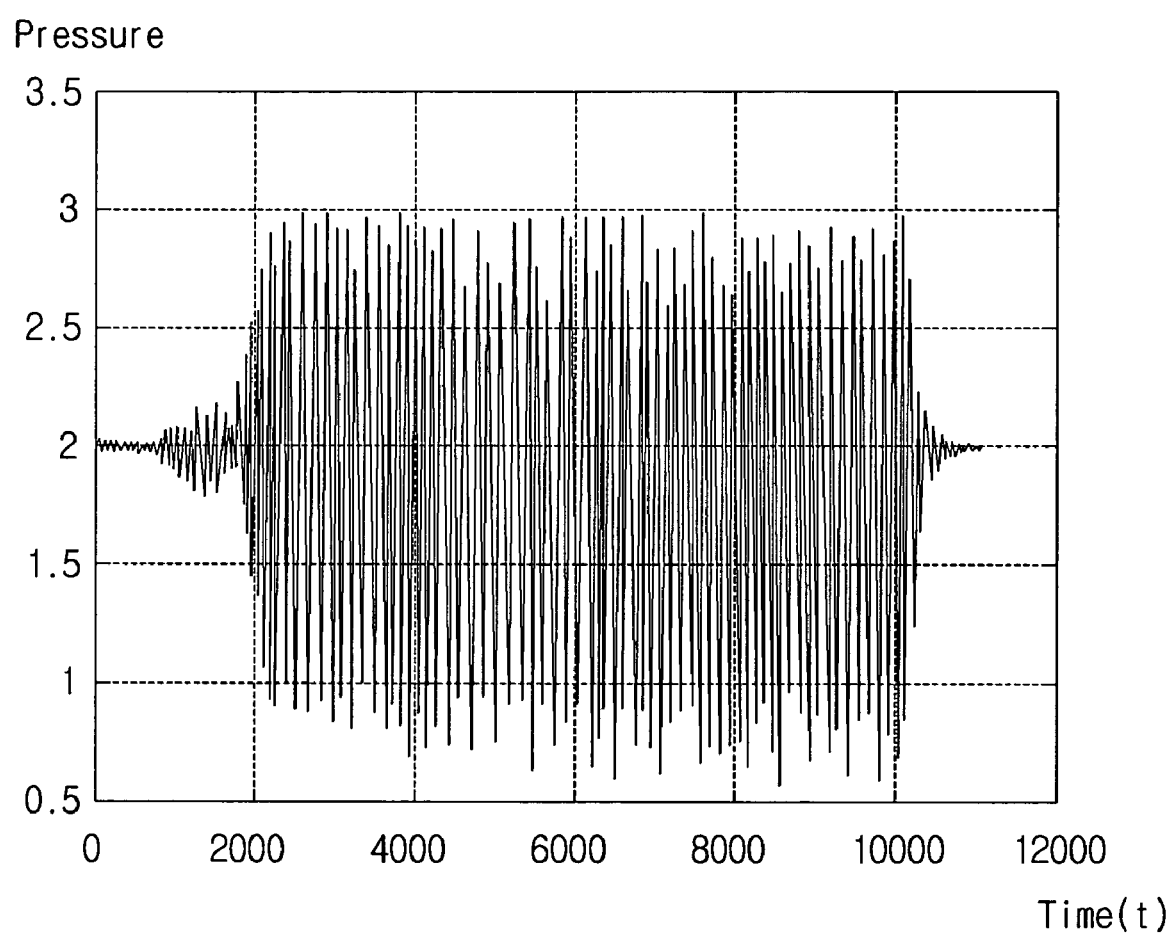
FIG. 2 is a graphical representation depicting pressure variation in a machine when sensing vibration with the pressure and vibration sensing apparatus consistent with the present invention.

The pressure and vibration sensing apparatus is configured such that, when the case 10 vibrates due to the vibration of the machine 1, the vibrating member 16 in the case 10 is moved to induce the pressure variation in the pressure space 11 of the case 10, allowing the pressure sensor 15 to sense the vibration of the machine 1 by sensing the pressure variation of the pressure space 11. Here, magnitude and frequency of the vibration of the vibrating member 16 are proportional to a degree of the vibration of the machine 1, and the pressure variation in the case 10 is also proportional to the magnitude and frequency of the vibration of the vibrating member 16. Thus, the pressure sensor 15 can sense the vibration of the machine 1 by sensing the pressure variation in the case 10 caused by the vibration of the machine 1. As such, when the vibration is generated, the pressure variation in the case 10 has characteristics as depicted in FIG. 2. That is, when the vibration is generated in the machine 1, the pressure variation in the case 10 according to the movement of the vibrating member 16 is increased, and thus the electrical signal output from the pressure sensor 15 is also significantly varied. Accordingly, the pressure and vibration sensing apparatus of the present invention enables a relatively accurate sensing of the presence of a vibration and magnitude thereof. Furthermore, since the electrical signal output from the pressure sensor 15 is amplified through the amplifying circuit 40, the vibration can be more accurately sensed.

Figure 3:
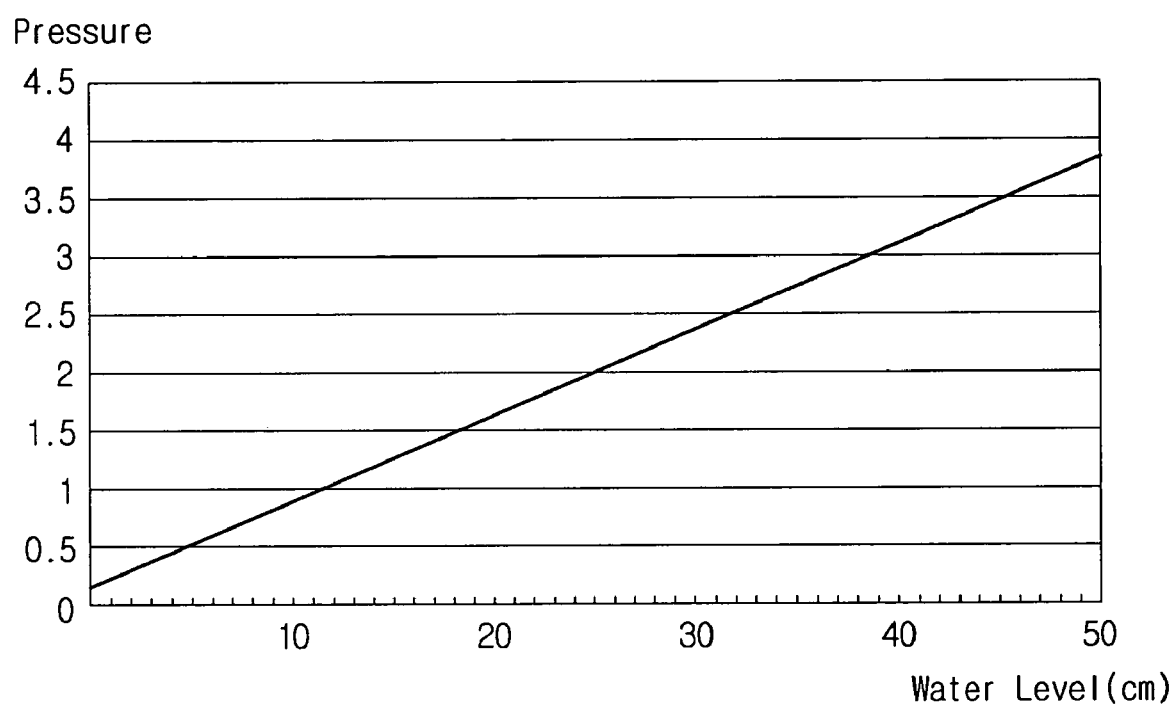
FIG. 3 is a graphical representation depicting a pressure variation in the machine when sensing pressure with the pressure and vibration sensing apparatus consistent with the present invention.

In the pressure and vibration sensing apparatus of the present invention, since spaces at both sides in the case 10 are communicated to each other through the air vent 18 provided at the center of the vibrating member 16, the pressure in the case 10 varied according to the pressure variation in the machine 1 is transferred to the pressure sensor 15 through the air vent 18, thereby allowing the pressure sensor 15 to sense the pressure in the machine 1. When sensing the pressure as described above, as shown in FIG. 3, the pressure in the case 10 is raised in proportion to an increase of the pressure in the machine, and the electrical signal output from the pressure sensor 15 has characteristics proportional to the increase of the pressure in the machine 1, thereby enabling the pressure in the machine 1 to be sensed.

Figure 4:
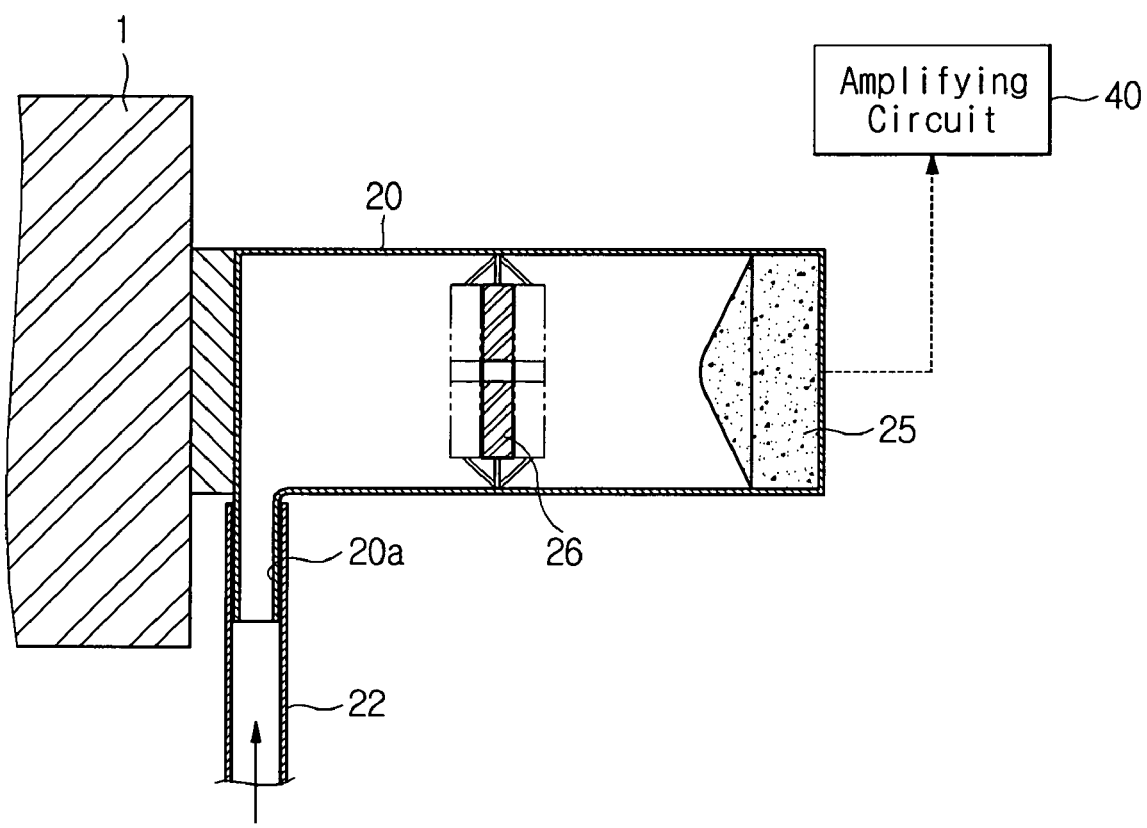
FIG. 4 is a cross-sectional view illustrating the construction of a pressure and vibration sensing apparatus according to a second embodiment of the present invention.

FIG. 4 is a cross-sectional view illustrating the construction of a pressure and vibration sensing apparatus according to a second embodiment of the present invention. Unlike the pressure and vibration sensing apparatus according to the first embodiment, the pressure and vibration sensing apparatus according to the second embodiment has a pressure sensor 25 sensing an inner pressure of the case 20 disposed in the case at the opposite side of the inlet 20a. Since the pressure and vibration sensing apparatus has a vibrating member 26 and a pressure tube 22, which are the same as those of the pressure and vibration sensing apparatus of the first embodiment, and the principle of sensing the pressure along with the vibration in the pressure and vibration sensing apparatus of the second embodiment is the same as that of the first embodiment, the description will be omitted.

An example of a washing machine having the pressure and vibration sensing apparatus of the invention applied thereto will be described as follows.

Figure 5:
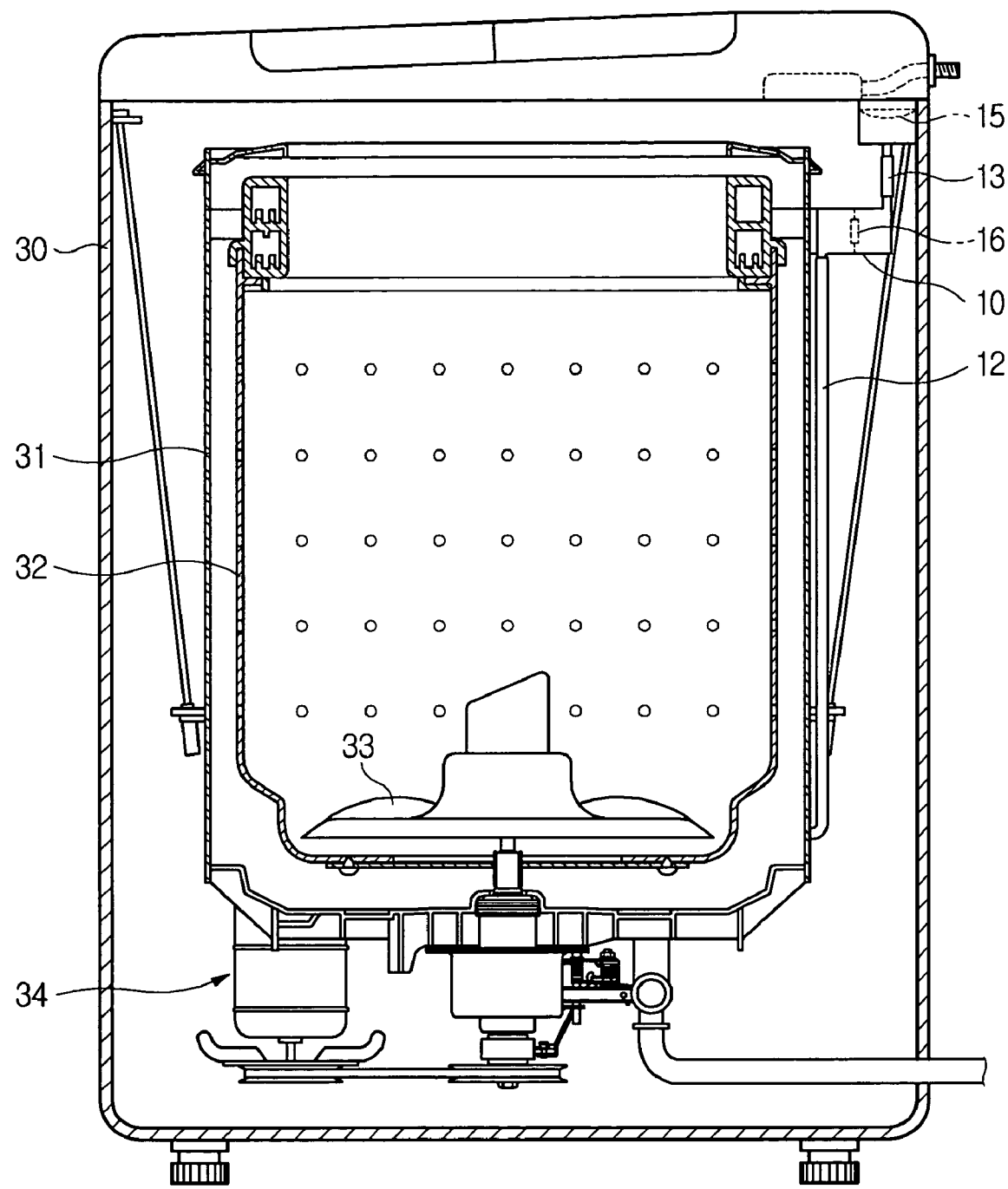
FIG. 5 is a cross-sectional view illustrating an example of a washing machine to which the pressure and vibration sensing apparatus of the present invention is applied.

As shown in FIG. 5, the washing machine is provided with a water reservoir 31 disposed in a body case 30 and storing water for washing clothes, and a tub 32 rotatably disposed in the water reservoir 31. The washing machine further comprises a pulsator 33 disposed in the tub 32 to generate a flow of water for washing the clothes while alternately rotating clockwise and counter clockwise, and a driving apparatus 34 mounted below the water reservoir 31 to rotate the tub 32 and the pulsator 33.

The pressure and vibration sensing apparatus of the present invention applied to the washing machine is mounted on an outer surface of the water reservoir 31 at an upper portion thereof. Specifically, the case 10 of the pressure and vibration sensing apparatus is mounted on the outer surface of the water reservoir 31 at the upper portion thereof, and the pressure tube 12 connected to the inlet of the case is extended to a lower portion of the water reservoir 31, and communicated to the inside of the water reservoir 31 at the lower portion thereof.

In this application, when water level in the water reservoir 31 is raised, variation in air pressure inside the pressure tube 21 caused by variation in the amount of the water flowing in the pressure tube 12 is transferred to the pressure sensor 15 through the pressure space of the case 10, so that the pressure sensor 15 can sense the water level in the washing machine by sensing the pressure variation. Additionally, the vibration of the water reservoir 31 is transferred to the case by the principle of sensing the vibration, as described above, and is then sensed by the pressure sensor 15.

As is apparent from the above description, since the pressure and vibration sensing apparatus consistent with the present invention has the construction wherein the pressure sensor senses the pressure in a machine by sensing the pressure transferred into the case through the inlet of the case from the machine, and senses the vibration of the machine by sensing the pressure variation in the case through the movement of the vibrating member, there are advantageous effects in that the pressure and vibration sensing apparatus can be provided as a unitary apparatus having multiple functions, while allowing easy manufacturing with reduced manufacturing costs.

Furthermore, since the pressure sensor can sense the vibration of the machine by sensing a minute pressure variation in the case caused by the vibration of the vibrating member, there is an advantageous effect in that the presence of the minute vibration and the magnitude thereof can be accurately sensed.

Although exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pressure and vibration sensing apparatus, comprising:
   a case adapted to be mounted in a machine which generates vibration, the case having an inlet communicated with a source of pressure;
   a pressure sensor sensing pressure variation in the case; and
   a vibrating member movably disposed in the case to induce the pressure variation in the case when vibration is generated in the machine, the vibrating member comprising a vent opening passing therethrough.

2. The pressure and vibration sensing apparatus according to claim 1, wherein the pressure sensor is disposed at the opposite side of the inlet of the case.

3. The pressure and vibration sensing apparatus according to claim 1, wherein the pressure sensor comprises a piezo-electric element.

4. The pressure and vibration sensing apparatus according to claim 1, further comprising an amplifying circuit to amplify an electrical signal output from the pressure sensor.

5. A pressure and vibration sensing apparatus comprising:
   a case adapted to be mounted in a machine which generates vibration, the case having an inlet communicated with a source of pressure;
   a pressure sensor sensing pressure variation in the case; and
   a vibrating member movably disposed in the case to induce the pressure variation in the case when vibration is generated in the machine;
   wherein the pressure sensor is disposed at the opposite side of the inlet of the case, and
   wherein the vibrating member comprises a stretchable connecting member substantially air-tightly connecting an outer periphery of the vibrating member and an inner surface of the case while allowing movement of the vibrating member, and an air vent penetrating the vibrating member.

6. The pressure and vibration sensing apparatus according to claim 5, wherein the vibrating member is disposed between the inlet of the case and the pressure sensor in the case.

7. A pressure and vibration sensing apparatus comprising:
   a case adapted to be mounted in a machine which generates vibration, the case having an inlet communicated with a source of pressure;
   a pressure sensor sensing pressure variation in the case;
   a vibrating member movably disposed in the case to induce the pressure variation in the case when vibration is generated in the machine;
   an outlet formed at the opposite side of the inlet of the case; and
   a connecting tube connecting the outlet and the pressure sensor to sense the pressure variation transferred through the outlet, the vibrating member being disposed between the inlet and the outlet of the case.

8. The pressure and vibration sensing apparatus according to claim 7, wherein the vibrating member comprises a stretchable connecting member substantially air-tightly connecting an outer periphery of the vibrating member and an inner surface of the case while allowing movement of the vibrating member, and an air vent penetrating the vibrating member.

9. The pressure and vibration sensing apparatus according to claim 8, wherein the vibrating member is disposed between the inlet of the case and the pressure sensor in the case.

* * * * *